(12) United States Patent
Williamson (10) Patent No.: US 12,253,112 B2
(45) Date of Patent: Mar. 18, 2025

(54) 3D PRINTED BUSHING WITH PRINTED GREASE PASSAGES AND LUBE FITTINGS INCORPORATED

(71) Applicant: GOODRICH CORPORATION, Charlotte, NC (US)

(72) Inventor: James Keith Williamson, Fairview Park, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 156 days.

(21) Appl. No.: 17/984,546

(22) Filed: Nov. 10, 2022

(65) Prior Publication Data

US 2024/0159272 A1    May 16, 2024

(51) Int. Cl.
| F16C 17/02 | (2006.01) |
| B23K 9/04 | (2006.01) |
| B64C 25/02 | (2006.01) |
| F16C 33/10 | (2006.01) |

(52) U.S. Cl.
CPC .......... F16C 33/1065 (2013.01); B23K 9/044 (2013.01); B64C 25/02 (2013.01); F16C 17/02 (2013.01); F16C 33/102 (2013.01); F16C 2326/43 (2013.01)

(58) Field of Classification Search
CPC .... F16C 17/02; F16C 33/102; F16C 33/1065; F16C 33/14; F16C 2223/46; F16C 17/10; B23K 9/044; B64C 25/02
See application file for complete search history.

(56) References Cited

U.S. PATENT DOCUMENTS

| 3,945,695 | A | * | 3/1976 | Speakman ............ | F16C 33/102 |
| | | | | | 384/291 |
| 5,964,325 | A | | 10/1999 | Davison et al. | |
| 9,206,839 | B2 | | 12/2015 | Dunlap | |
| 11,111,958 | B1 | * | 9/2021 | Tate ...................... | F16C 17/028 |
| 2003/0085321 | A1 | | 5/2003 | Reniau | |
| 2008/0292230 | A1 | | 11/2008 | Hsieh et al. | |
| 2018/0363704 | A1 | | 12/2018 | Coombe et al. | |
| 2020/0354085 | A1 | | 11/2020 | Baird et al. | |
| 2021/0254658 | A1 | * | 8/2021 | Schmidt ................ | F16C 11/045 |
| 2021/0261241 | A1 | * | 8/2021 | Holt ....................... | F16C 11/045 |
| 2022/0154879 | A1 | | 5/2022 | Zendri et al. | |
| 2022/0325753 | A1 | | 10/2022 | Perdrigeon et al. | |

FOREIGN PATENT DOCUMENTS

| EP | 3228539 A1 | * | 10/2017 | ............. B64C 25/10 |
| JP | 2010517838 A | * | 5/2010 | |

OTHER PUBLICATIONS

European Patent Office, European Search Report dated Jul. 3, 2024 in Application No. 23207549.9.
European Patent Office, European Partial Search Report dated Apr. 4, 2024 in Application No. 23207549.9.

* cited by examiner

*Primary Examiner* — Phillip A Johnson
(74) *Attorney, Agent, or Firm* — SNELL & WILMER L.L.P.

(57) ABSTRACT

A bushing for use in an aircraft includes a hollow cylindrical shaft having a first end and a second end opposite the first end, a radially outwardly extending flange disposed at the first end of the hollow cylindrical shaft, an entry way disposed along the radially outwardly extending flange, and a lubrication passageway fluidly coupled to the entry way. The lubrication passageway extends between the first end and the second end.

15 Claims, 6 Drawing Sheets

3D PRINTED BUSHING WITH PRINTED GREASE PASSAGES AND LUBE FITTINGS INCORPORATED

FIELD

In general, the arrangements disclosed herein relate to landing gear, and more particularly, to additively manufactured lubrication channels for landing gear bushings.

BACKGROUND

Landing gear components generally include lubrication channels. The lubrication channels are typically drilled through the landing gear components to provide a flow path to provide lubrication to a joint of the landing gear component. These lubrication channels can create stress concentration regions and/or potential fatigue failure points in the landing gear components. Additionally, forming the lubrication channels by drilling through the various landing gear components tends to increase the time and cost associated with channel formation. It also tends to limit the possible channel locations and geometries, as a limited number of areas are accessible to the machines used to drill the channels. As such, the need exists for improved lubrication channel configurations and methods to create lubrication passageways through the bushing.

SUMMARY

A bushing for use in an aircraft includes a hollow cylindrical shaft having a first end and a second end opposite the first end, a radially outwardly extending flange disposed at the first end of the hollow cylindrical shaft, an entry way disposed along the radially outwardly extending flange, and a lubrication passageway fluidly coupled to the entry way. The lubrication passageway extends between the first end and the second end.

In various embodiments, the bushing is 3D printed such that the lubrication passageway is 3D printed at any desired position along the bushing.

In various embodiments, the bushing further includes a grease fitting disposed on an outer surface of the radially outwardly extending flange. The entry way is a threaded portion of the lubrication passageway such that the grease fitting is configured to couple to the entry way via the threaded portion.

In various embodiments, the grease fitting is configured to couple with a greasing gun to deliver a lubricant through the lubrication passageway.

In various embodiments, the bushing further includes a plurality of grease fittings, wherein the plurality of grease fittings is circumferentially positioned along the radially outwardly extending flange.

In various embodiments, the bushing further includes a plurality of lubrication passageways, wherein the plurality of lubrication passageways are circumferentially disposed along the hollow cylindrical shaft of the bushing, corresponding with the plurality of grease fittings.

In another aspect, a landing gear assembly includes a dynamic joint and a bushing coupled to the dynamic joint. The bushing includes a hollow cylindrical shaft having a first end and a second end opposite the first end, a radially outwardly extending flange disposed at the first end of the hollow cylindrical shaft, an entry way disposed along the radially outwardly extending flange, and a lubrication passageway fluidly coupled to the entry way. The lubrication passageway extends between the first end and the second end.

In various embodiments, the dynamic joint comprises a first component and a second component coupled to the first component via a pin connection.

In various embodiments, the bushing is configured to be positioned between the first component and the pin connection.

In various embodiments, the second component includes a strut of shock strut configured to telescope relative to a shock strut cylinder.

In various embodiments, an end of the second component includes a lug disposed around a spherical bearing.

In various embodiments, the bushing is 3D printed such that the lubrication passageway is 3D printed at any desired position along the bushing.

In various embodiments, the bushing further includes a grease fitting disposed on an outer surface of the radially outwardly extending flange. The entry way is a threaded portion of the lubrication passageway such that the grease fitting is configured to couple to the entry way via the threaded portion.

In various embodiments, the grease fitting is configured to couple with a greasing gun to deliver a lubricant through the lubrication passageway.

In various embodiments, the bushing further includes a plurality of grease fittings. The plurality of grease fittings is circumferentially positioned along the radially outwardly extending flange.

In various embodiments, the bushing further includes a plurality of lubrication passageways. The plurality of lubrication passageways are circumferentially disposed along the hollow cylindrical shaft of the bushing, corresponding with the plurality of grease fittings.

In yet another aspect, a method for 3D printing a bushing includes preparing a print based on an additive manufacturing technology, slicing the print to detect any islands or discontinuity between layers, and performing post-processing.

In various embodiments, the method further includes adding supports for a 3D model, removing the supports, and post-print curing.

In various embodiments, the method further includes performing design optimization, such as varying design geometry, features, or print parameters to accommodate for any warpage, distortion, or shrinkage.

In various embodiments, the method further includes generating an acoustic design model in software, and converting the acoustic design model into an additive manufacturing readable file, wherein the additive manufacturing readable file.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings illustrate various embodiments employing the principles described herein and are a part of this specification. The illustrated embodiments are meant for description only, and they do not limit the scope of the claims, and in which:

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Furthermore, any reference to singular includes plural embodiments, and any reference to more than one component or step may include a singular embodiment or step. Also, any reference to attached, fixed, connected or the like may include permanent, removable, temporary, partial, full, and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not be necessarily repeated herein for the sake of clarity.

As used herein, a first component that is "radially outward" of a second component means that the first component is positioned at a greater distance away from a common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component. All ranges may include the upper and lower values, and all ranges and ratio limits disclosed herein may be combined. Unless specifically stated otherwise, reference to "a," "an" or "the" may include one or more than one and reference to an item in the singular may also include the item in the plural.

As used herein, the term "additive manufacturing" encompasses any method or process whereby a three-dimensional object is produced by creation of a substrate or material to an object, such as by addition of successive layers of a material to an object to produce a manufactured product having an increased mass or bulk at the end of the additive manufacturing process than the beginning of the process. In contrast, traditional manufacturing (e.g., forms of subtractive manufacturing) by machining or tooling typically relies on material removal or subtractive processes, such as cutting, lathing, drilling, grinding, and/or the like, to produce a final manufactured object that has a decreased mass or bulk relative to the starting workpiece. Other traditional manufacturing methods includes forging or casting, such as investment casting, which utilizes the steps of creating a form, making a mold of the form, and casting or forging a material (such as metal) using the mold. As used herein, the term "additive manufacturing" should not be construed to encompass fabrication or joining of previously formed objects.

A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, and digital light processing. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, are intended to be included within the scope of the present disclosure.

Conventional landing gear components may be formed into the desired shape using traditional manufacturing methods, such as casting, forging, or subtractive manufacturing. Lubrication channels are then drilled into the component such that lubricant can be provided to the various component joints during maintenance operations. Such techniques tend to limit the potential geometries and locations of lubrication channels. Additionally, an error or misalignment in channel drilling may result in the component being unusable, such that the component must be discarded, resulting in greater cost and manufacturing time.

Landing gear components of the present disclosure, in accordance with various embodiments, are formed using an additive manufacturing technique. Forming the component using additive manufacturing allows lubrication channels to be formed at the time of component formation, as opposed to drilling the lubrication channels after forming the component. Simultaneously forming the component and the lubrication channels may reduce manufacturing time and cost as the potential for drilling error is eliminated. Additively manufacturing the lubrication channels also allows for channel designs and geometries that could not be produced through conventional manufacturing. For example, in various embodiments, additive manufacturing techniques may be employed to form lubrication channels having a curved or angled flow path. The lubrication channels may be designed to avoid high stress zones in the component. In various embodiments, the cross-sectional shape of the lubrication channel may be tailored to reduce stress concentrations in the component. In this regard, additive manufacturing can enable fabrication of complex lubrication channel designs within a landing gear component.

The present disclosure provides, in various embodiments, bushings containing lubrication fittings and passageways that are created using an additive manufacturing (e.g., 3-D printing) process. The lubrication fitting may be modeled and applied to a bushing to allow for a greasing gun to be attached. The bushing also includes passageways to allow the grease to get to the desired joint feature needing lubrication.

By eliminating the need for drilling to deliver lubrication, long holes through expensive steel and titanium components can be prevented. Further, manufacturing costs are reduced by moving grease ports from through holes in major components to the bushings where possible. This would simplify the component manufacture, reduce production risks in making lube hole and bosses, and prevent misaligned holes and broken tooling. The number of parts is also reduced as the lubrication fitting is incorporated into the bushing itself.

Figure 1:
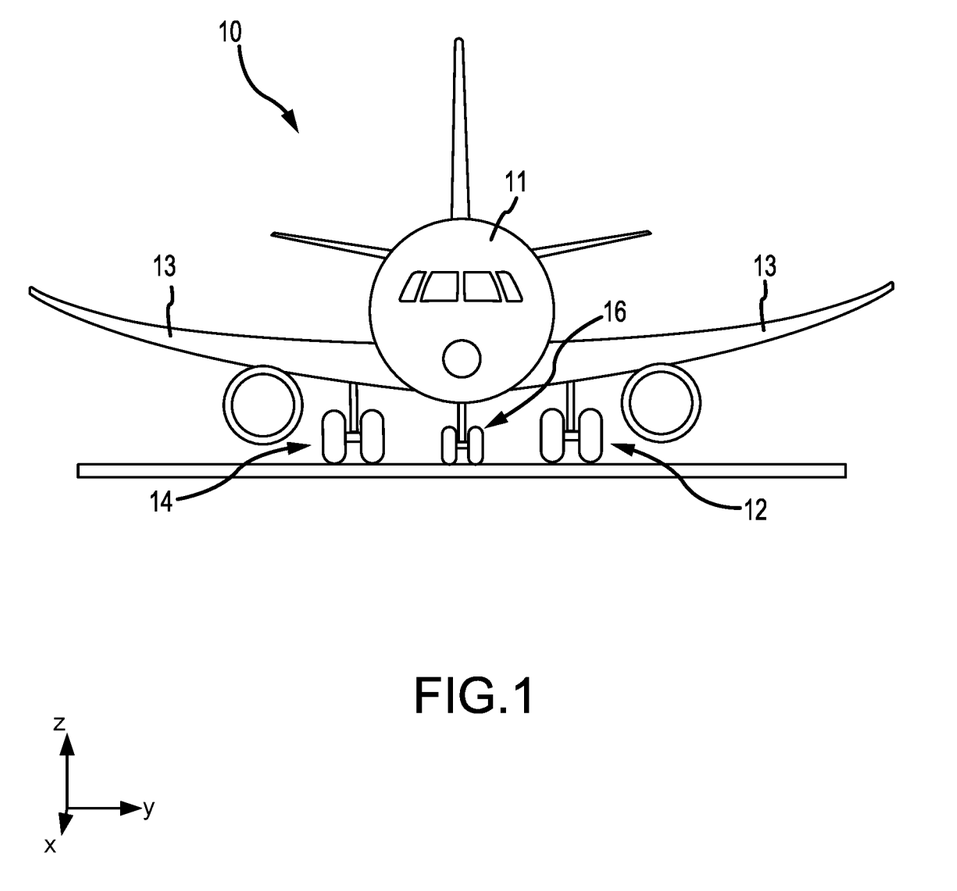
FIG. 1 illustrates an aircraft, in accordance with various embodiments.

With reference to FIG. 1, an aircraft 10 is illustrated, in accordance with various embodiments. Aircraft 10 includes a fuselage 11 and wings 13. Aircraft 10 includes landing gear such as left landing gear assembly 12, right landing gear assembly 14, and nose landing gear assembly 16 (referred to herein collectively as landing gear assemblies 12, 14, 16). Landing gear assemblies 12, 14, 16 may generally support aircraft 10, when aircraft 10 is not flying, allowing aircraft 10 to taxi, take-off, and land without damage. Landing gear assemblies 12, 14, 16 may each include various shock and strut assemblies with one or more wheels attached thereto. Landing gear assemblies 12, 14, 16 may each be configured to translate between a landing gear down position, wherein the landing gear assemblies extend from wings 13 and/or fuselage 11 to support aircraft 10, and a landing gear up position, wherein the landing gear assemblies are located within wings 13 and/or fuselage 11 of aircraft 10. For example, during taxiing and take-off, and landing, landing gear assemblies 12, 14, 16 may be in the landing gear down position. After take-off, landing gear assemblies 12, 14, 16 may be translated to the landing gear up position. Prior to landing, landing gear assemblies 12, 14, 16 may be translated to the landing gear down position to support aircraft 10 during landing.

Figure 2:
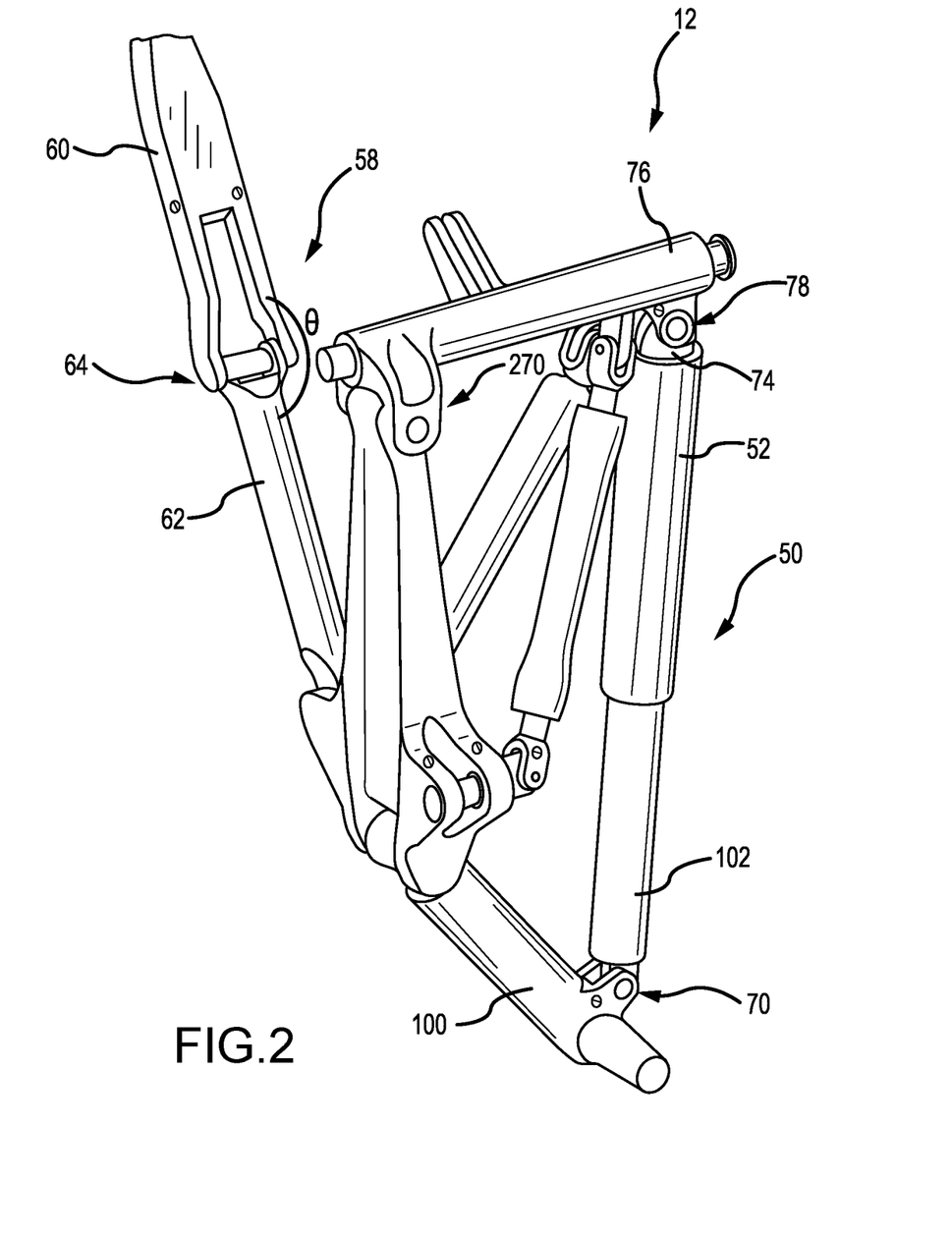
FIG. 2 illustrates components of a landing gear assembly, in accordance with various embodiments.

Referring to FIG. 2, and with continued reference to FIG. 1, components of left landing gear assembly 12 are illustrated, in accordance with various embodiments. While FIGS. 2, 3A, 3B, 3C, and 3D illustrate components of left landing gear assembly 12, it should be understood that right landing gear assembly 14 and nose landing gear assembly 16 may include the elements and functionalities as described herein with respect to left landing gear assembly 12.

Left landing gear assembly 12 may include one or more shock absorbing devices, such as for example, shock strut 50. Shock strut 50 may absorb and damp loads imposed on left landing gear assembly 12 during landing, taxiing, braking, and takeoff. Shock strut 50 may include a cylinder and a strut configured to telescope relative to the cylinder. Left landing gear assembly 12 may include various linkage assemblies, such as, for example, linkage assembly 58. Linkage assembly 58 may be configured to translate left landing gear assembly 12 between the landing gear up and landing gear down positions.

In accordance with various embodiments, various components of left landing gear assembly 12 may be coupled to one another via dynamic joints. For example, a first strut 60 of linkage assembly 58 may be coupled to a second strut 62 of linkage assembly 58 via a dynamic joint 64. As used herein, a "dynamic joint" refers to a coupling between a first component and a second component, wherein the first component and/or the second component is/are configured to pivot about the dynamic joint such that an angle of the first component relative to the second components changes. For example, during landing gear extension and retraction (i.e., when left landing gear assembly 12 is translated between the landing gear down and landing gear up positions), second strut 62 pivots about dynamic joint 64 such that an angle theta ($\theta$) between first strut 60 and second strut 62 changes. Left landing gear assembly 12 may include multiple dynamic joints.

In accordance with various embodiments, various components of left landing gear assembly 12 may be coupled to one another via static joints. For example, an end 74 of shock strut cylinder 52 may be coupled to an upper linkage (or strut) 76 via a static joint 78. As used herein, a "static joint" refers to a coupling between a first component and a second component, wherein the first and second component do not pivot about the joint. For example, when left landing gear assembly 12 is translated between the landing gear down and landing gear up positions, the angle between end 74 of shock strut 50 and upper linkage 76 remains relatively constant. While components coupled via a static joint do not rotate, it is further contemplated and understood that the components may exhibit some motion due to structural deflections of the joint generated by loads applied to the landing gear assembly.

In accordance with various embodiments, each of the dynamic joints and static joints of left landing gear assembly 12 comprises a first component coupled to a second component via a pin connection. In other words, each of the dynamic joints and static joints of left landing gear assembly 12 includes a pin located through a first component and through a second component.

Figure 3A:
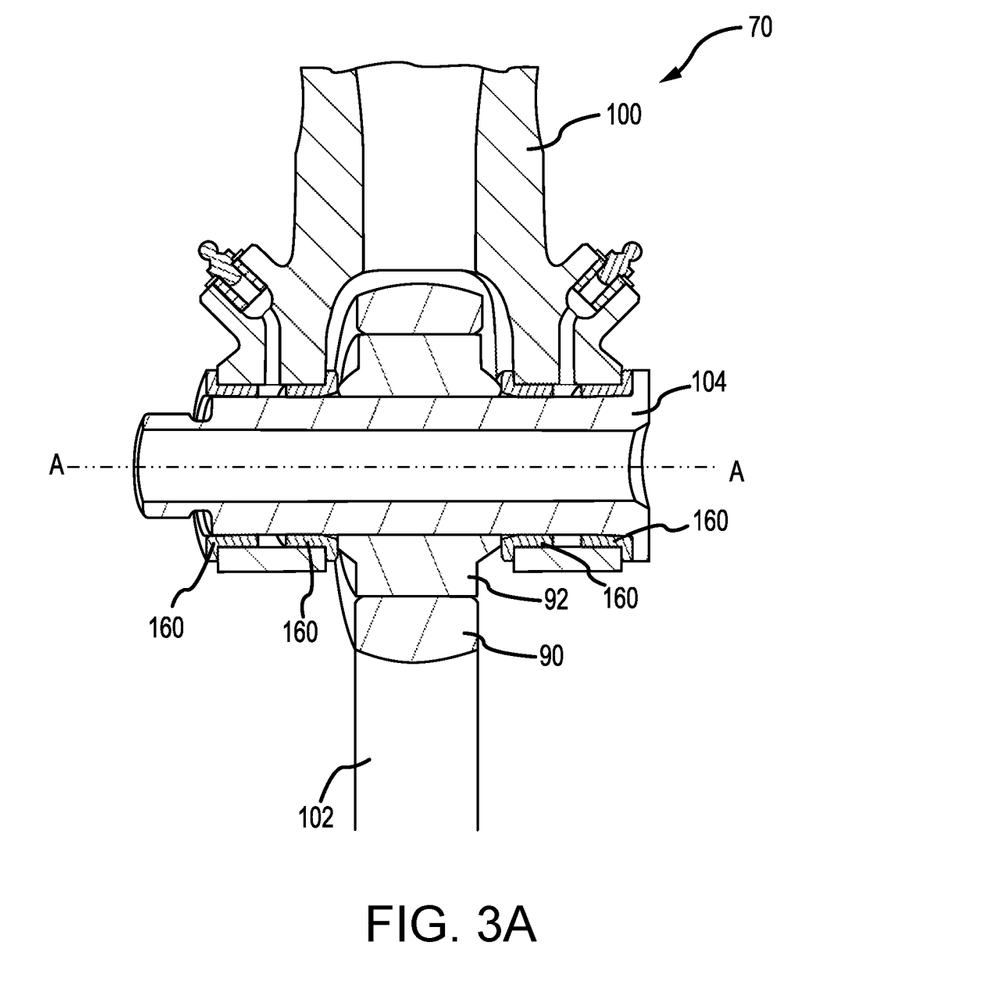
FIGS. 3A, 3B, 3C, and 3D illustrate a dynamic landing gear joint and a bushing having additively manufactured lubrication channels, in accordance with various embodiments.

With reference to FIG. 3A, and continuing reference to FIG. 2, a cross-section view of a dynamic joint 70 of left landing gear assembly 12 is illustrated, in accordance with various embodiments. While FIG. 3A illustrates components of dynamic joint 70, it should be understood that any of the dynamic joints of left landing gear assembly 12 may include the elements and functionalities as described herein with respect to dynamic joint 70.

At dynamic joint 70, a first landing gear component 100 (referred to herein as first component 100) is coupled to a second landing gear component 102 (referred to herein as second component 102) via a pin 104. First component 100 and second component 102 may pivot, relative to one another, about pin 104. In various embodiments, second component 102 may comprise a strut of shock strut 50 configured to telescope relative to shock strut cylinder 52. In various embodiments, an end of second component 102 may include a lug 90 disposed around a spherical bearing 92.

In various embodiments, one or more bushing(s) 160 may be located between first component 100 and pin 104. During landing gear maintenance, lubricant (e.g., grease) may be provided to each pin connection (i.e., to the dynamic and static joints of left landing gear assembly 12). The lubricant may be provided by a lubricant gun fluidly coupled to the inlet of a lubrication channel extending through the bushing 160.

Figure 3B:
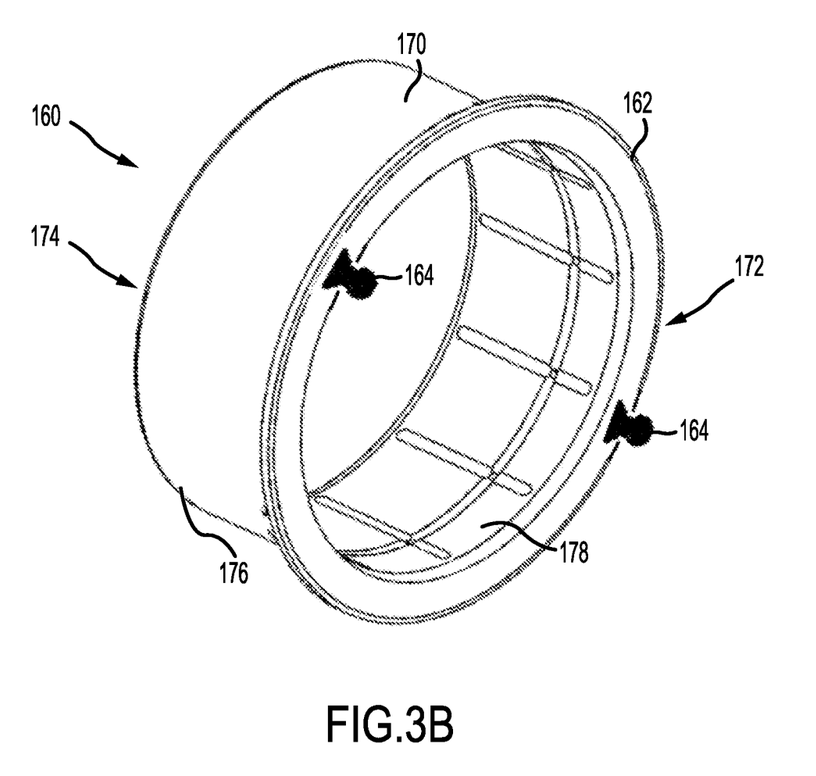
Figure 3C:
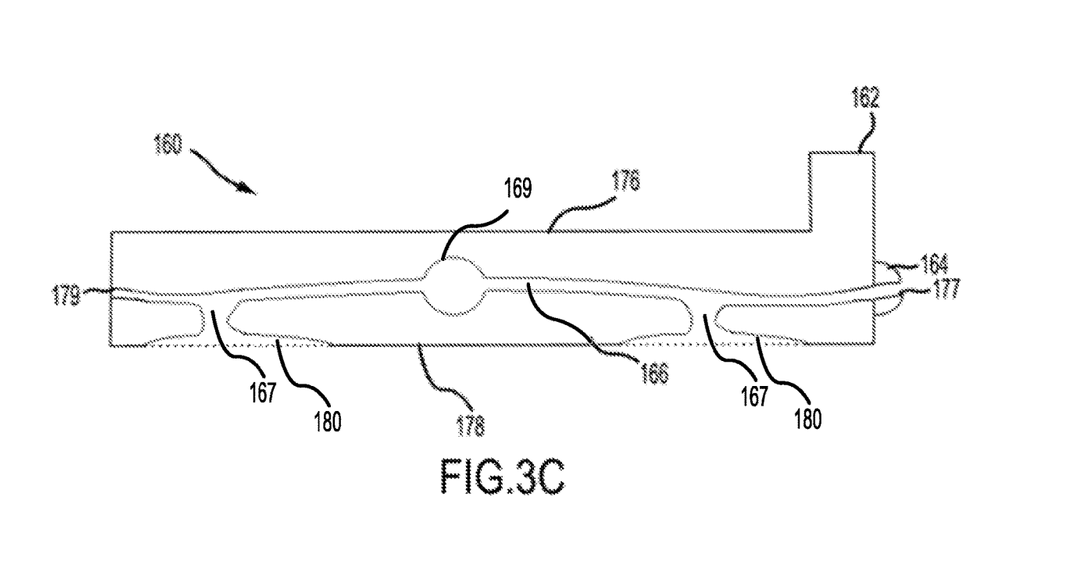
Figure 3D:
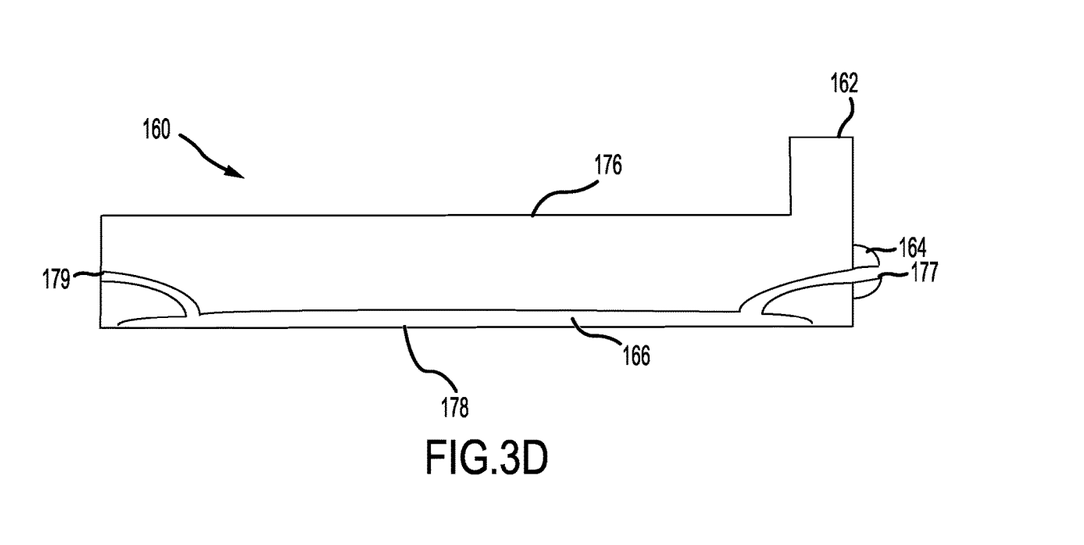

Referring now to FIGS. 3B, 3C and 3D, in various embodiments, bushing 160 is shaped to be a hollow cylindrical shaft 170. The hollow cylindrical shaft 170 includes a first end 172 and a second end 174, opposite the first end 172. In various embodiments, bushing 160 includes a radially outwardly extending flange 162 disposed at an end (e.g., the first end 172) thereof.

Bushing 160 may be 3D printed. Three-dimensional object printing (3D printing) is an additive process in which one or more ejector heads eject successive layers of material on a substrate in different shapes. The substrate is supported either on a platform that can be moved three dimensionally by operation of actuators operatively connected to the platform, or the ejector heads are operatively connected to one or more actuators for controlled movement of the ejector heads to produce the layers that form the object. 3D printing is distinguishable from traditional object-forming techniques, which mostly rely on the removal of material from a work piece by a subtractive process, such as cutting or drilling.

Manufacturing the bushing 160 via additive manufacturing (e.g., 3D printing) beneficially allows design adaptability, as compared to subtractive manufacturing. In other words, 3D printing allows for complex and detailed designs that can be more easily customized than if the parts were traditionally machined. For instance, as described herein, the bushing 160 may include lubrication passageways. Accordingly, via 3D printing, the lubrication passageway can be created as a thin passageways thus avoiding compromising the integrity of the bushing 160 and the bushing may include a plurality of passageways. The plurality of passageways may then be designed to the desired number and various locations along the bushing 160.

Bushing 160 may further include a grease fitting 164. The grease fitting 164 may be disposed on an outer surface of the flange 162. The grease fitting 164 may be configured to be an entry point for a lubricant into the bushing 160. For instance, the grease fitting 164 may be configured to couple with a lubricant dispenser, or greasing gun or the like, such that the greasing gun injects a lubricant into the grease fitting. In various embodiments, the bushing 160 may include a plurality of grease fittings 164. The plurality of grease fittings 164 may be circumferentially positioned along the flange 162. In various embodiments, the plurality of grease fittings 164 may be evenly spaced (equidistant) circumferentially along the flange 162. In various embodiments, the plurality of grease fittings 164 may be unevenly spaced circumferentially along the flange 162. The spacing of the grease fittings 164 may be determined based on the particular application and desired lubricant delivery location.

The bushing 160 may include a lubrication passageway 166. The lubrication passageway 166 provides a flow path for lubricant (e.g., grease), thereby allowing the lubricant to be provided to pin 104. The lubrication passageway 166 may be a void, a channel, a tunnel etc. disposed within the bushing 160. Particularly, the lubrication passageway 166 may extend from the first end 172 to the second end 174 of the cylindrical shaft 170. The lubrication passageways 166 may be entirely disposed between an outer surface 176 and an inner surface 178 of the cylindrical shaft 170 such that the lubrication passageways 166 do not create a ridge along the outer surface 176 or the inner surface 178 of the cylindrical shaft 170. In various embodiments, lubrication passageways 166 define raised ribs across the cylindrical shaft 170, the raised ribs extending from the first end 172 to the second end 174. The lubrication passageways 166 may be straight channels from the first end 172 to the second end 174 such that there is an entry way 177 on the first end 172 and an exit point 179 at the second end 174. For instance, as described herein, the entry way 177 may be the grease fitting 164. In various embodiments, the entry way 177 may be a threaded portion of the lubrication passageway 166. Accordingly, the entry way 177 may be configured to couple with the grease fitting 164 via the threaded portion. Accordingly, the exit point 179 may be an aperture on the rim of the cylindrical shaft 170 at the second end 174. In various embodiments, the lubrication passageways 166 may not be straight channels.

For instance, as shown in FIG. 3C, the lubrication passageway 166 may curve from the entry way 177 and extends along a center of the cylindrical shaft 170 toward the exit point 179. The lubrication passageway 166 may be non-parallel to the outer surface 168 or the inner surface 176. The lubrication passageway 166 may includes a reservoir 169. The reservoir 160 may be a spherical cutout along the lubrication passageway 166. The lubrication passageway 166 may include at least one branch 167 extending from the lubrication passageway 166 toward the inner surface 178. The branch 167 may be configured to narrow from the lubrication passageway 166 toward the inner surface 178 and widen as it approaches the inner surface 178 and defines an opening 180. Such a configuration (e.g., a nozzle to a diffuser) creates a flow of the viscous lubricating fluid. For instance, the reservoir 169 may allow the grease to move circumferentially around the bushing 160 to the different contact points from a single lube port (e.g., grease fitting 164). FIG. 3B illustrates two lube ports (e.g., grease fitting 164), however, in various embodiments, multiple points of contact where the lube comes out of the bushing 164 may be included on the inner diameter (e.g., inner surface 178) via the lubrication passageway 166. Thus, the lubrication passageways 166 may deliver the lubricant to the inner surface 178. In various embodiments, the lubrication passageway 166 may include two branches 167 and two openings 180. In various embodiments, the at least one branch 167 may extend from the lubrication passageway 166 toward the outer surface 176. Thus, the lubrication passageways 166 may deliver the lubricant to the outer surface 176.

In various embodiments, as shown in FIG. 3D, the lubrication passageway 166 may curve from the entry way 177 toward the inner surface 178 of the cylindrical shaft 170, extends adjacent the inner surface 178, and curved again toward the exit point 179. Thus, the lubrication passageways 166 may deliver the lubricant to the inner surface 178.

The lubrication passageway 166 may be fluidly coupled to the grease fitting 164. Accordingly, the grease fitting 164 may deliver the lubricant from the greasing gun to and through the lubrication passageway 166 from the first end 172 to the second end 174 to lubricate the components adjacent the bushing 160. In various embodiments, the bushing 160 may include a plurality of lubrication passageways 166. The plurality of lubrication passageways 166 may be circumferentially disposed along the cylindrical shaft of the bushing 160, corresponding with the plurality of grease fittings 164. In various embodiments, the plurality of lubrication passageways 166 may be evenly spaced (equidistant) circumferentially along the cylindrical shaft 160. In various embodiments, the plurality of lubrication passageways 166 may be unevenly spaced circumferentially along the cylindrical shaft 170. The spacing of the lubrication passageways 166 may be determined based on the particular application and desired lubricant delivery location.

The bushing 160 is 3D printed such that the grease fitting 164 is designed to be disposed on the flange 162 and the lubrication passageway 166 is designed to be disposed onto the cylindrical shaft 170 of the bushing 160 all as one monolithic piece, thus allowing the lubrication passageway 166 to be put in a precise location as needed. In other words, the grease fitting 164 and the lubrication passageway 166 are integral to the bushing 160. In that regard, the term "integral" in this context only may mean fabricated or manufactured as a single, continuous component.

In accordance with various embodiments, the bushing 160 is formed using additive manufacturing. For example, the bushing 160 may be formed using wire arc additive manufacturing, electron beam additive manufacturing, or any other suitable additive manufacturing technique. Forming the bushing 160 using additive manufacturing allows the flow paths defined by the lubrication passageways 166 to be curved and/or angled and/or include bends. In this regard, lubricant may flow axially, radially, and/or circumferentially between the entry way 177 and the exit point 179. The geometry of the lubrication passageways 166 may to be selected to avoid high stress zones.

Figure 4:
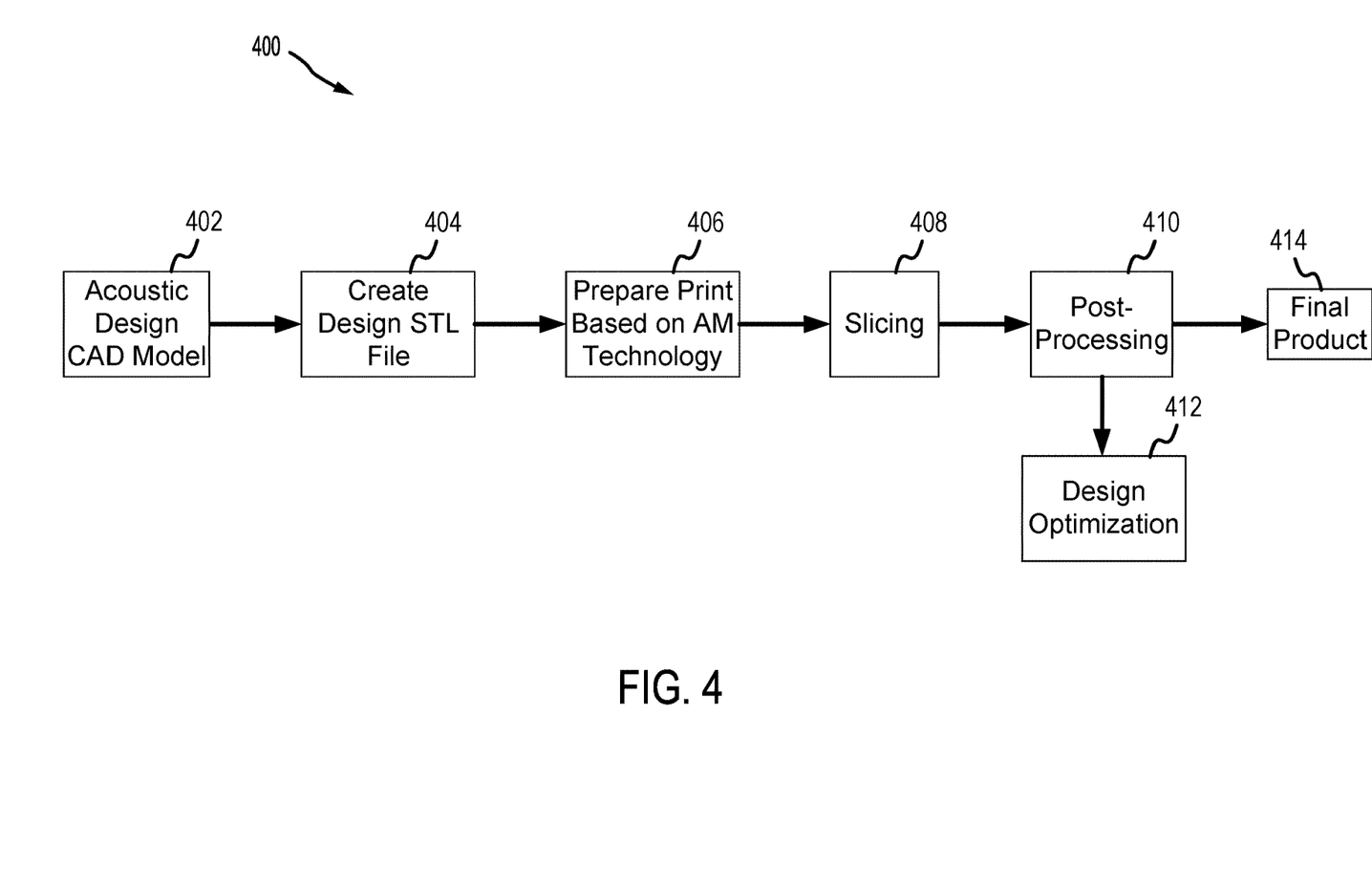
FIG. 4 illustrates a method of printing a 3D printed bushing, in accordance with various embodiments.

Referring now to FIG. 4 a method 400 of additive manufacturing (e.g., 3D printing) a bushing is illustrated, in accordance with various embodiments. Additive manufacturing techniques may allow the design of structures to be optimized for load, strength, tuned bending resistance, and improved vibration damping characteristics. In various embodiments, the geometry and configuration of bushing 160 comprises a configuration that improves lubrication delivery while maintaining strength of the affected components, among other benefits, as opposed to drilling the lubrication ports through the various components. Further, the bushing 160 can comprise structures optimized with geometric characteristics such as the lubrication passageway 166, and/or the like to tune desired lubrication delivery location, improve adaptability/customization, reduce weight, and reduce manufacturing risks.

At step 402, an acoustic design model is generated in software, such as CAD (computer-aided design) software. For instance, the design of a desired bushing is defined. For example, step 402 can comprise utilizing two-dimensional modeling techniques to create a bushing design having at least one of: improved dynamic stability, tuned positioning, reduced weight, etc. For example, the bushing at step 402 can include geometric attributes such as the grease fitting 164 and the lubrication passageway 166, as well as asymmetric features to improve stability. At step 404, the acoustic design model may be converted into an additive manufacturing readable file—e.g., a 3D printing file, such as an STL (stereolithography) file; though the particular type of 3D printing file may vary depending on the particular additive manufacturing method and software being used. In general, the STL file is used as a storage point for information concerning a 3D model. The information is stored in a format that offers a representation of the "raw" surface of the 3D model (e.g., illustrated of triangle shapes, or the like). The more detailed and complex the 3D model is, the more triangles the program tends to use to create a representation of the model.

At step 406, a print is prepared based on the additive manufacturing technology. For example, supports for the 3D model may be added. Supports, or a support structure, are an added part that supports an overhanging portion or bridge structure (e.g., when the material the part is being made of is not stiff enough to support itself) when slicing the model, which needs to be removed after printing. The principle of the FDM printer is to melt and overlay the filament layer by layer. Further, step 406 may include the part may be oriented based on the design or application, the material may be selected, the layer thickness may be selected, the features sizes may be selected, the wall thickness may be selected, the passageway positioning and sizes may be selected, the surface finish may be selected, the dimensional accuracy may be selected, and/or the build size may be selected.

At step 408, software may be used to "slice" the 3D print to detect any islands or discontinuity between layers. At step 410, post-processing may be performed. Post-processing may include removal of the supports, cleaning of the part(s), and/or post-print curing (e.g., a thermal or UV (ultraviolet) cure). For instance, to remove the supports, Isopropyl Alcohol (IPA) may first be used to wash liquid resin off of the completed part, then the support structures can be either broken off the surface of the model or removed using pliers. The spots where the support was in contact with the object may then be sanded to remove any remaining marks. In various embodiments, at step 412, design optimization may be performed. For example, design geometry, features, and/or print parameters may be varied to accommodate for any warpage, distortion, and/or shrinkage observed. Steps 402 through 410 may then be repeated using the optimized design parameters. At step 414, a final additively manufactured product, such as a resonator network of the present disclosure, is produced.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one, and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching is used throughout the figures to denote different parts, but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are only illustrated in the figures to help to improve understanding of embodiments of the present, representative disclosure.

Any reference to attached, fixed, connected, or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas, but not necessarily to denote the same or different materials. In some cases, reference coordinates may be specific to each figure.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements, but it may also include other elements not expressly listed or inherent to such process, method, article, or apparatus.

What is claimed is:

1. A bushing for use in an aircraft, the bushing comprising:
    a hollow cylindrical shaft having a first end and a second end opposite the first end;
    a radially outwardly extending flange disposed at the first end of the hollow cylindrical shaft;
    an entry way disposed along the radially outwardly extending flange;
    a lubrication passageway fluidly coupled to the entry way, the lubrication passageway extending between the first end and the second end; and
    a grease fitting disposed on an outer surface of the radially outwardly extending flange, wherein the entry way is a threaded portion of the lubrication passageway such that the grease fitting is configured to couple to the entry way via the threaded portion.

2. The bushing of claim 1, wherein the bushing is 3D printed such that the lubrication passageway is 3D printed at any desired position along the bushing.

3. The bushing of claim 1, wherein the grease fitting is configured to couple with a greasing gun to deliver a lubricant through the lubrication passageway.

4. The bushing of claim 1, further comprising a plurality of grease fittings, wherein the plurality of grease fittings is circumferentially positioned along the radially outwardly extending flange.

5. The bushing of claim 4, further comprising a plurality of lubrication passageways, wherein the plurality of lubrication passageways is circumferentially disposed along the hollow cylindrical shaft of the bushing, corresponding with the plurality of grease fittings.

6. A landing gear assembly, comprising:
    a dynamic joint; and
    a bushing coupled to the dynamic joint, the bushing comprising:
        a hollow cylindrical shaft having a first end and a second end opposite the first end;
        a radially outwardly extending flange disposed at the first end of the hollow cylindrical shaft;
        an entry way disposed along the radially outwardly extending flange; and
        a lubrication passageway fluidly coupled to the entry way, the lubrication passageway extending between the first end and the second end.

7. The landing gear assembly of claim 6, wherein the dynamic joint comprises a first component and a second component coupled to the first component via a pin connection.

8. The landing gear assembly of claim 7, wherein the bushing is configured to be positioned between the first component and the pin connection.

9. The landing gear assembly of claim 7, wherein the second component comprises a strut of shock strut configured to telescope relative to a shock strut cylinder.

10. The landing gear assembly of claim 7, wherein the lubrication passageway comprises at least one branch.

11. The landing gear assembly of claim 6, wherein the bushing is 3D printed such that the lubrication passageway is 3D printed at any desired position along the bushing.

12. The landing gear assembly of claim 6, further comprising a grease fitting disposed on an outer surface of the radially outwardly extending flange, wherein the entry way is a threaded portion of the lubrication passageway such that the grease fitting is configured to couple to the entry way via the threaded portion.

13. The landing gear assembly of claim 12, wherein the grease fitting is configured to couple with a greasing gun to deliver a lubricant through the lubrication passageway.

14. The landing gear assembly of claim 12, further comprising a plurality of grease fittings, wherein the plurality of grease fittings is circumferentially positioned along the radially outwardly extending flange.

15. The landing gear assembly of claim 14, further comprising a plurality of lubrication passageways, wherein the plurality of lubrication passageways is circumferentially disposed along the hollow cylindrical shaft of the bushing, corresponding with the plurality of grease fittings.

* * * * *